US006134887A

United States Patent [19]

Bertotti et al.

[11] Patent Number: 6,134,887

[45] Date of Patent: Oct. 24, 2000

[54] HYDRAULIC CONTROL CIRCUIT FOR WORKING MEMBERS OF EARTH-MOVING MACHINES

[76] Inventors: Elio Bertotti, Corso Villaniova n. 20, 10087 Valperga (TO); Giovanni Maria Testa, Via Belevedere, 38, 10080 Borgiallo (TO), both of Italy

[21] Appl. No.: 08/372,387

[22] Filed: Dec. 21, 1994

(Under 37 CFR 1.47)

[30] Foreign Application Priority Data

Dec. 21, 1993 [IT] Italy ................................ TO93A0970

[51] Int. Cl.[7] ...................................................... F16D 31/02

[52] U.S. Cl. ................................ 60/422; 60/424; 60/426; 91/516; 91/518

[58] Field of Search ............................ 60/420, 421, 422, 60/424, 426, 468; 91/514, 516, 517, 518

[56] References Cited

U.S. PATENT DOCUMENTS 4,343,151 8/1982 Lorimor .

4,463,557 8/1984 Miller .

FOREIGN PATENT DOCUMENTS 2758268 5/1979 Germany .

3421502 12/1985 Germany .

9111622 8/1991 WIPO .

*Primary Examiner*—Hoang Nguyen

*Attorney, Agent, or Firm*—Barnes, Kisselle, Raisch, Choate, Whittemore & Hulbert

[57] ABSTRACT

A hydraulic control circuit for, for example, working members of earth-moving machines such as backhoe loaders. A first and a second control section (9,10) are coupled to first and second linear hydraulic actuators (1,2; 3–8) through respective first a second hydraulic spool valves (21,22; 23–28), and supply (11) of a hydraulic fluid under pressure is connected in parallel with the two control sections (9,10) via a feed line (13). A load sensing circuit (16) is associated with the first and second spool valves. The control circuit includes a series-parallel connection circuit (36) of the load sensing circuit (16), and additional optional devices ensuring a higher operative functionality of the working members of the machine.

8 Claims, 7 Drawing Sheets

BACKHOE-LOADER MACHINE

HYDRAULIC CONTROL CIRCUIT FOR WORKING MEMBERS OF EARTH-MOVING MACHINES

The present invention is related to hydraulic control circuits for the working members of earth-moving machines, and more particularly, although not exclusively, of backhoe loader vehicles having a front loader assembly including first hydraulic linear actuators for actuating first respective working members (boom arms), and a rear swinging backhoe assembly including second hydraulic linear actuators for actuating second respective working members (boom and dipper arms).

Hydraulic control circuits for the working members of such earth-moving machines traditionally comprise a first and a second control section of said first and said second hydraulic linear actuators, respectively, including respective first and second hydraulic spool valves, the spool of each of which is positionable in a first end position corresponding to displacement in a first direction, in a central, null position, and in a second end position corresponding to displacement in a second direction opposite to said first direction of the respective hydraulic linear actuator; supply means of a hydraulic fluid under pressure and in parallel to said first and second control sections via at least one feed line; and a load sensing circuit associated with said first and second hydraulic spool valves of said first and second control sections for controlling the supply of said hydraulic fluid to said first and second actuators in response to hydraulic signals indicative of the respective operating pressures thereof.

In the application to a backhoe loader machine, the second control section of the circuit includes a main hydraulic spool valve and associated priority hydrostat arranged in the said feed line for controlling a main hydraulic actuator, normally operating the boom arm of the backhoe.

The object of the present invention is to provide a hydraulic control circuit of the above-referenced type which enables achievement of better operating performances of the controlled working members, with particular reference to the adjustment and graduality of the displacement thereof, to an enhanced utilisation of the hydraulic fluid rate-of-flow at low pressure levels and to increased possibilities of simultaneous operation thereof, as well as to the achievement of a higher operative cycle speed and of a reduction of the installed horsepower for the supply of the hydraulic fluid under pressure.

A further object of the invention is to provide a circuit of the above-referenced type which can be readily adapted to different application demands.

The invention is defined in the appended claims.

According to one aspect of the present invention there is provided a hydraulic control circuit of the type set forth at the beginning, the main feature of which resides in that it further comprises a return line from said main hydraulic spool valve towards said feed line downstream of the priority hydrostat, and a load sensing series/parallel control valve for controlling the communication between said return line and the feed line as a function of the pressure within said feed line.

According to a secondary feature of the invention, the first control section of the circuit further comprises a relief valve of the said feed line, the opening of which is piloted by said load sensing circuit.

Additionally, the spool of said main hydraulic spool valve of the second control section may conveniently include a check valve acting in the position corresponding to raising of the working member operated by said main hydraulic actuator, and in this case a regeneration circuit of the load sensing signal is associate to said priority hydrostat.

Backhoe loader machines are normally provided with a swing system of the backhoe loader assembly, comprising a pair of counteracting hydraulic linear actuators coupled to each other and simultaneously operated through a single hydraulic spool valve. In this case, according to a further feature of the invention, a local load sensing valve is operatively associated to said spool distributor.

The control circuit according to the invention may be implemented according to a circuitry configuration entirely of the load sensing type, or entirely of the open-center type.

The invention will now be disclosed in greater detail, by way of example, with reference to the accompanying drawings, in which.

Figure 1:
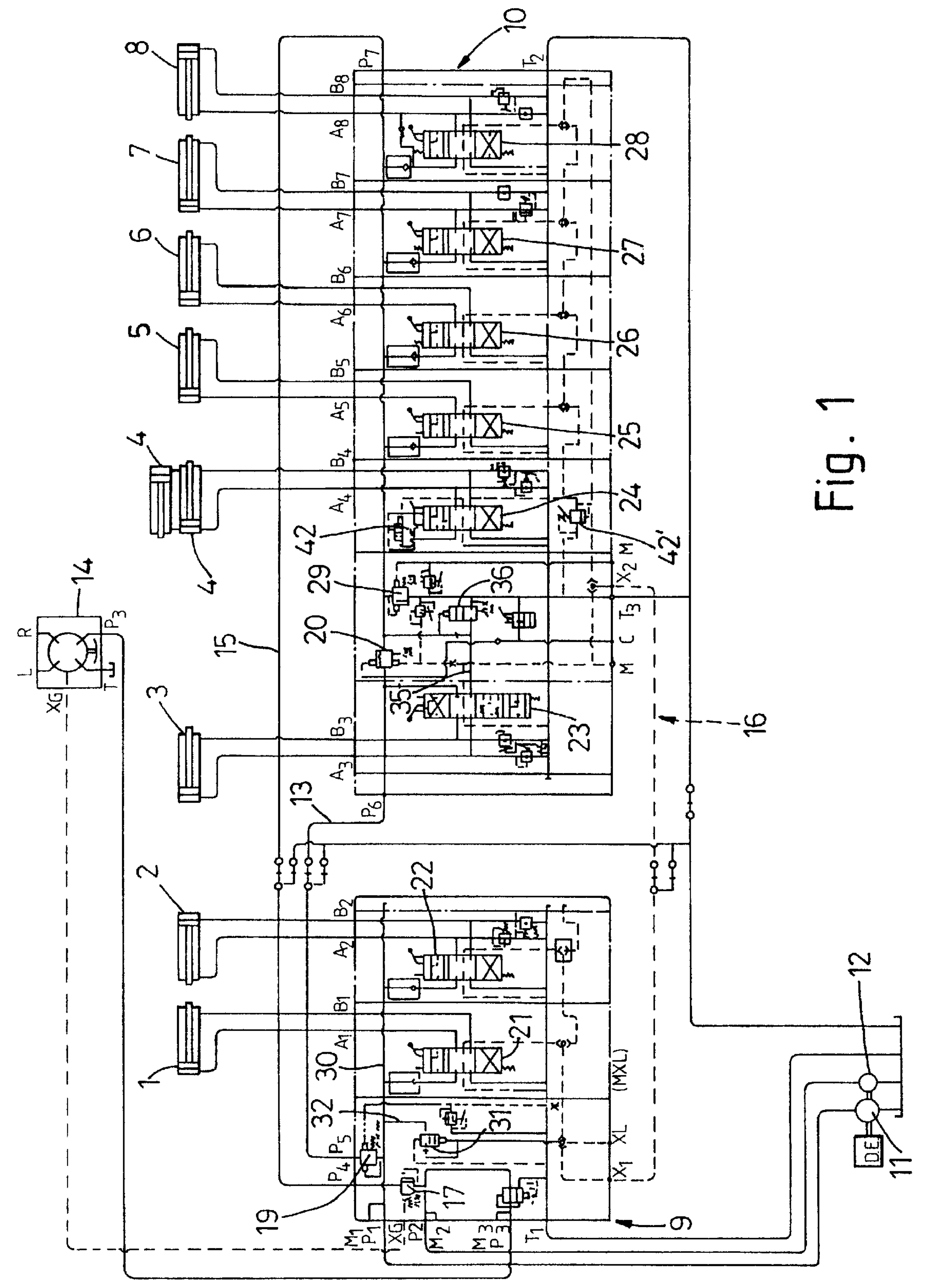
FIG. 1 shows the general diagram of a hydraulic control circuit according to the invention.

FIG. 1 shows diagrammatically the essential components of a first embodiment of a hydraulic control circuit for the working members of an earth-moving machine of the backhoe loader type. These working members, which are conventional and for the sake of ease of illustration are thus not depicted in the figure, comprise a front loader assembly including a raising/lowering boom and a bucket carried by the boom, and a rear backhoe assembly including a first raising/lowering boom, a dipper arm or second boom pivotally connected to the first boom, a bucket carried by the dipper arm, vertically movable outriggers for jacking up the machine during operation, and possibly clamp members for locking swinging of the rear assembly relative to the structure of the machine.

The above working members are operated by means of respective hydraulic linear actuators: in particular, as far as the front loader assembly is concerned, a first linear actuator 1 for displacing the raising/lowering boom and a linear actuator 2 for displacing the bucket carried by the raising/lowering boom are provided; as far as the rear backhoe assembly is concerned, a linear actuator 3 for operating the main boom, a linear actuator 8 for operating the dipper arm, a linear actuator 7 for actuating the bucket, linear actuators 5,6 for operating the machine outriggers, and a pair of counter-acting and mutually coupled linear actuators 4 for effecting swinging motion of the main boom (i.e. of the rear backhoe assembly) around a substantially vertical axis of the machine, are provided. For operation of the clamp means to prevent swinging of the main boom of the rear backhoe assembly relative to the structure of the machine, one or more linear actuators are further provided.

For operation of the two groups of hydraulic linear actuators 1,2; 3–8 of the front loader assembly and of the rear backhoe assembly, respectively, the hydraulic control circuit according to the invention comprises a first control section 9 and a second control section 10 both connected to a supply source of a hydraulic fluid under pressure, in the way which will be clarified herebelow.

In the case of the example shown in FIG. 1, the hydraulic fluid under pressure is supplied by two hydraulic pumps: a first pump or main pump 11, for the parallel supply through a feed line 13 to the control devices comprised within the first control section 9 and within the second control section 10, and a second pump or secondary, and normally smaller, pump 12 for the supply of hydraulic fluid under pressure to a hydraulic steering unit 14 of the machine and, through a second feed line 15 for the parallel supply to the control devices of the second control section 10.

For supplying and discharging the actuators 1,2: 3–8 of the front assembly and of the rear assembly, respectively, hydraulic valves 21,22 are provided within the first control section 9, and hydraulic valves 23,24,25,26,27 and 28 are provided within the second control section 10. The valve 24 performs simultaneous and opposite operation of both hydraulic swing actuators 4.

Each of the valves 21–28 is provided, in a way known per so and thus for brevity not disclosed in detail, with a spool which can be set in three conditions corresponding respectively to the movement of the respective linear actuators 1–8 in a first direction, stoppage (null) and movement in a second direction opposite to the first.

The stoppage or null condition is that in which the spool of the valve is set in the central position shown in the drawings.

The inlet-outlet connections between the valves 21–28 and the respective actuators 1–8 are indicated as $A_1$, $B_1$ . . . $A_8$, $B_8$ (FIGS. 2 and 3), respectively.

The setting of the spool of the valves 21–28 in the three possible conditions is achieved in a conventional way, directly or by means of remote hydraulic servo-piloting systems.

Reference 16 generally designates as a whole a load sensing control circuit associated with the valves 21,22 and 23–28 of the two control sections 9 and 10, through which the controlled supply of the hydraulic fluid under pressure to the first actuators 1,2 and to the second actuators 3–8, respectively, is performed in response to hydraulic signals indicative of the respective operating pressures.

The disposition and the function of the load sensing control circuit 16 are generally known, and hence will not be disclosed in detail for the sake of brevity.

The connections between the load sensing control circuit 16 and the control section 9,10 are indicated as $X_1$, $X_2$, respectively, and reference $P_1$, $P_5$ and $P_6$ designate the connections between the main pump 11 and these control sections 9,10, respectively, and references $P_2$, $P_4$ and $P_7$ indicate the connection between the secondary pump 12 and the control sections 9,10, respectively. The connections between the secondary pump 12 and the hydraulic steering unit 14 are indicated at $P_3$.

As a matter of fact, the supply of the hydraulic fluid under pressure from the secondary pump 12 to the second control section 10 and to the hydraulic steering unit 14 is controlled by a priority hydrostat 17, in a way known to an expert in the art.

The discharge connections of the two control section 9 and 10 are indicated as $T_1$, $T_2$ and $T_3$, respectively.

The supply of the hydraulic fluid under pressure from the main pump 11 to the parallel feed line 13, which connects the first control section 9 to the second control section 10, is controlled by means of a priority hydrostat 19 which in turn is piloted, in a conventional way, by the load sensing control circuit 16.

In the second control section 10, the supply of the hydraulic fluid under pressure delivered from the parallel feed line 13 is in turn controlled by means of a main hydrostat 20, placed downstream of the hydraulic valve 23 associated with the linear actuator 3 of the first boom of the backhoe, and by a secondary hydrostat 29, both piloted by means of the hydraulic signals of the load sensing circuit 16, in a conventional way.

Figure 2:
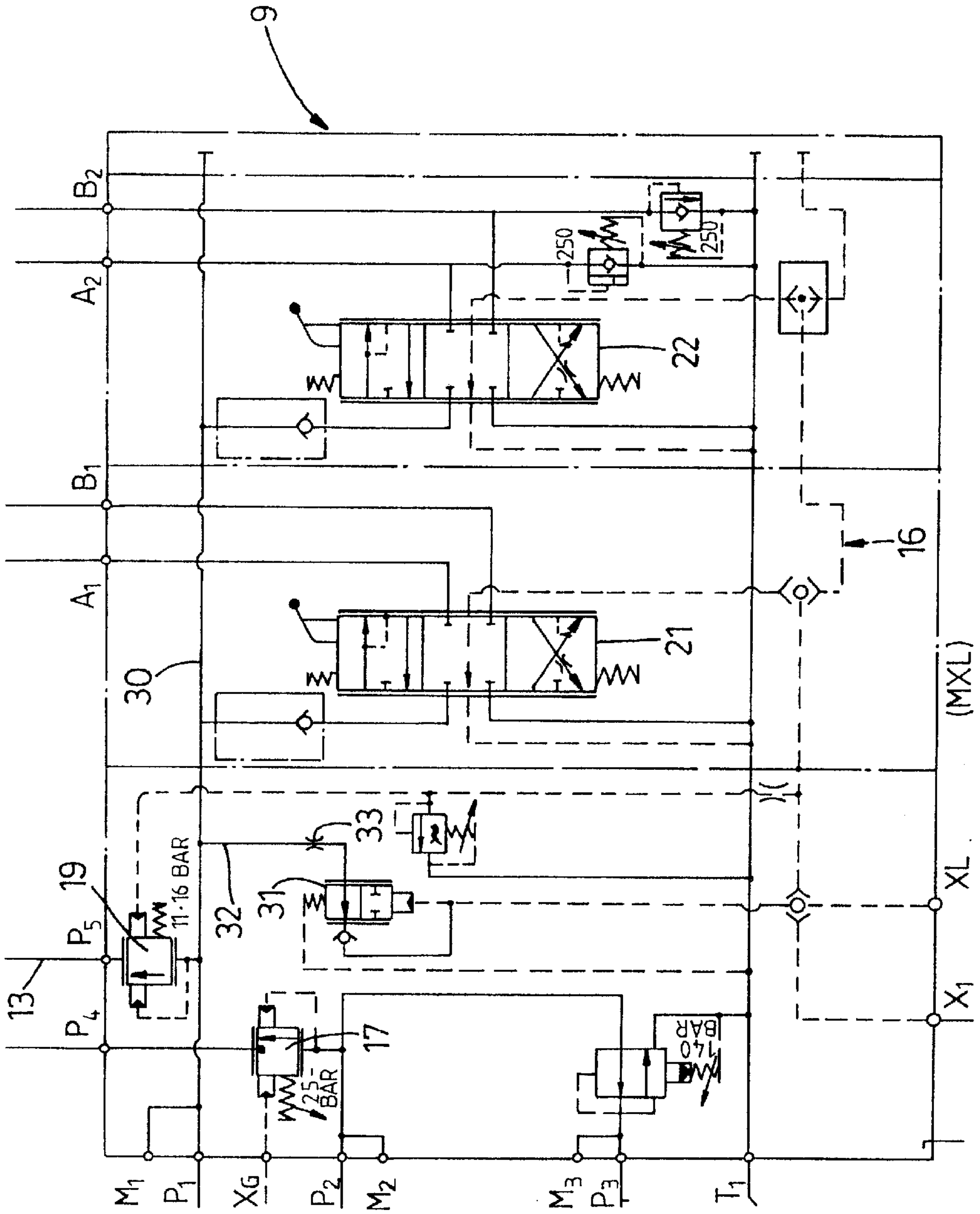
FIG. 2 shows on an enlarged scale a first section of the circuit of FIG. 1.

Referring now in greater detail to FIG. 2, the inlet $P_1$ connecting the main pump 11 with the first control section 9 is connected with the hydraulic valves 21 and 22 associated with the two actuators 1 and 2 of the front loader assembly via a parallel inlet line 30, connected to the outlet $P_5$ with the parallel feed line 13 through the priority hydrostat 19.

The first control section 9 includes a regeneration or anti-cavitation device of the load sensing control circuit 16 by the inlet line 30, whose function is to avoid, during operation of certain control members, depressurizion of the load sensing circuit 16, i.e. to prevent the pressure within such circuit decreasing below the spring setting value of the priority hydrostat 19, with the benefit of an improved control adjustment and graduality. This regeneration device is actually constituted by a pressure reducing valve 31 provided within the load sensing circuit 16 and connected to the food line 30, i.e. upstream of the priority hydrostat 19, through a by-pass line 32 in which a calibrated restriction 33 is fitted.

Figure 4:
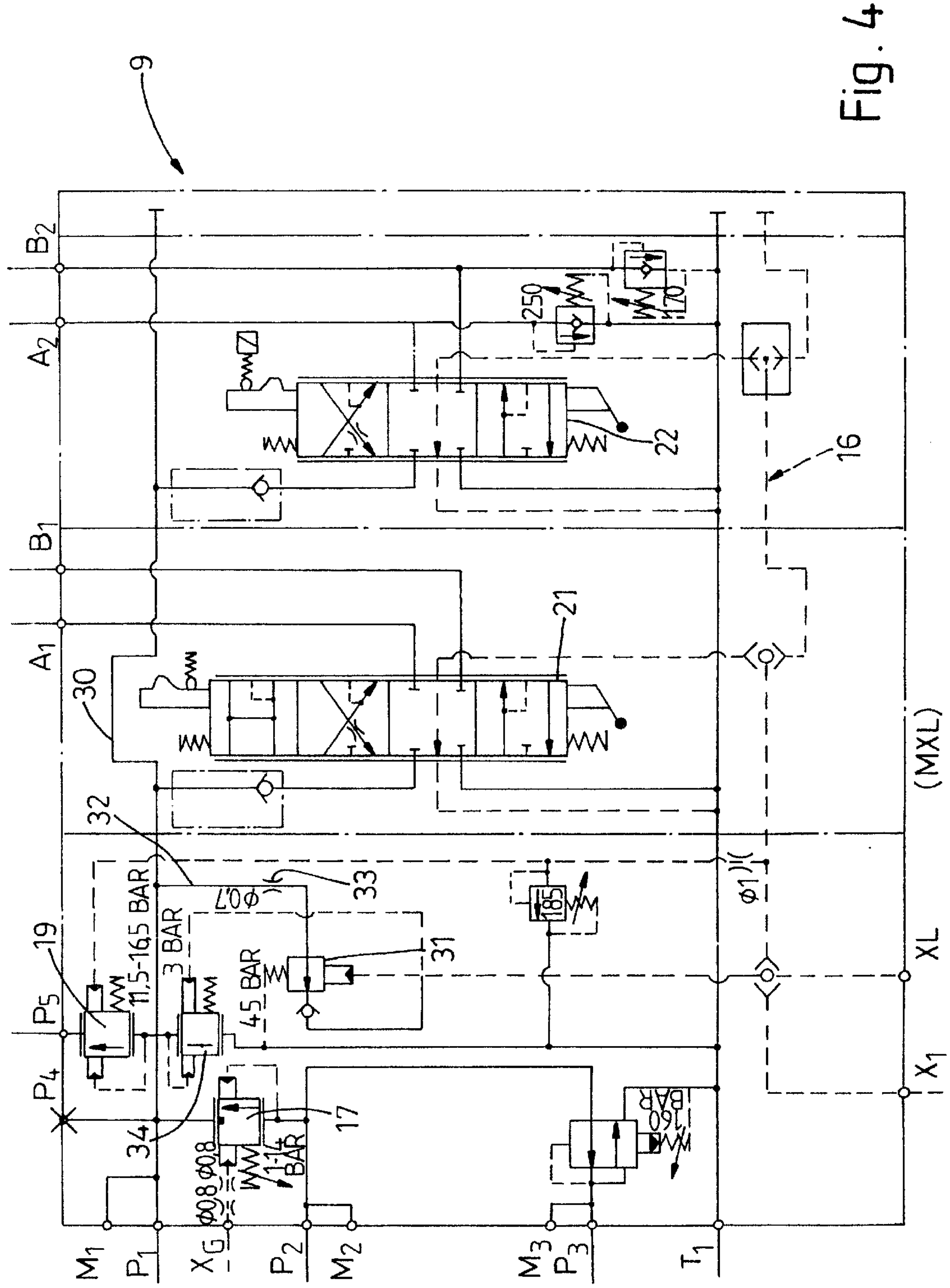
FIG. 4 shows an alternative embodiment of FIG. 2.

According to the alternative embodiment shown in FIG. 4, the first control section 9 further comprises a calibrated relief valve 34 in the feed line 30, the opening of which is piloted by the load sensing control circuit 16. This relief valve 34 enables connection to the discharge of all the flow of the main pump 11 when same is not used, for instance during road transfer of the vehicle, in an automatic way and thus without the need for any specific control.

Figure 3:
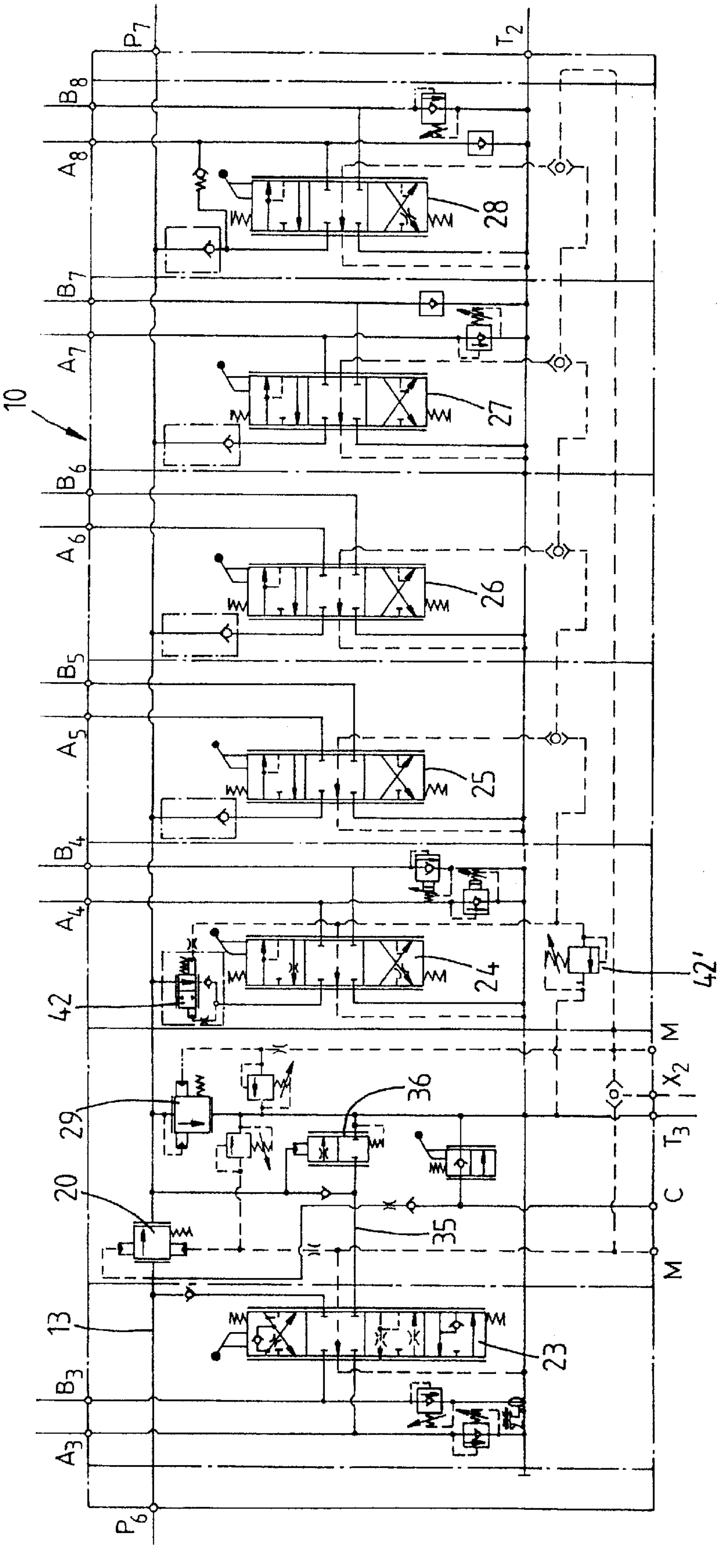
FIG. 3 shows on an enlarged scale a second section of the circuit of FIG. 1.

Turning now to FIG. 3, a primary feature of the invention is related to the hydraulic valve 23 associated with the linear actuator 3 which effects raising and lowering of the first boom of the backhoe assembly of the machine. The spool valve 23, which therefore constitutes the main valve of the second control section 10 through the main hydrostat 20 located in the parallel feed line 13, is provided with a series-parallel device for enabling simultaneous operation of further actuators of the second control section 10, and more specifically an enhanced flow rate utilisation at low pressure levels when in the series mode of the series-parallel device, thus increasing the operating speed, with reduced size and reduced horsepower of the main pump 11. To such effect a load sensing control valve 36 is provided in the return line, referenced 35, of the hydraulic valve 23 from the cylinder of the linear actuator 3 to the parallel feed line 13, downstream of the priority hydrostat 20. This control valve 36 controls the communication between the return line 35 and the parallel feed line 13 downstream of the priority hydrostat 20, as a function of the pressure within the feed line 13.

In operation, the control valve 36 enables the series supply of the next valves 24–28 of the second control section 10, or proportionally switching to a circuit in parallel when the maximum power of the system is reached. This is achieved by the use of a calibrated relief valve 37 (FIG. 5) operatively associated with the control valve 36 in such a way that the opening of valve 37 will also open valve 36, i.e. to switch valve 36 from a series mode to a parallel mode.

According to another aspect of the invention, which is common to the embodiments of FIGS. 1–3 and 5, a local pressure compensator 42 is operatively associated with the hydraulic valve 24 which controls the pair of counter-operating actuators performing swinging of the rear backhoe assembly. The local compensator 42 may be of the form shown in detail in FIG. 6 and by which an energy saving effect can be achieved. The local compensator 42, which is piloted by the load sensing circuit 16, is placed between the feed line 13 of the pump 11 and the inlet of the valve 24, thus avoiding the influence of any variations in the operating pressure of the whole system on the graduality of the backhoe swinging motion. In other words, the provision of the compensator 42 enables the supply of hydraulic fluid to the two actuators 4 to be such as to achieve gradual acceleration and controlled speed of operation. The energy saving is achieved by the use of a relief valve 42' associated with the compensator 42 to provide a non-relieving pressure limiter.

Figure 5:
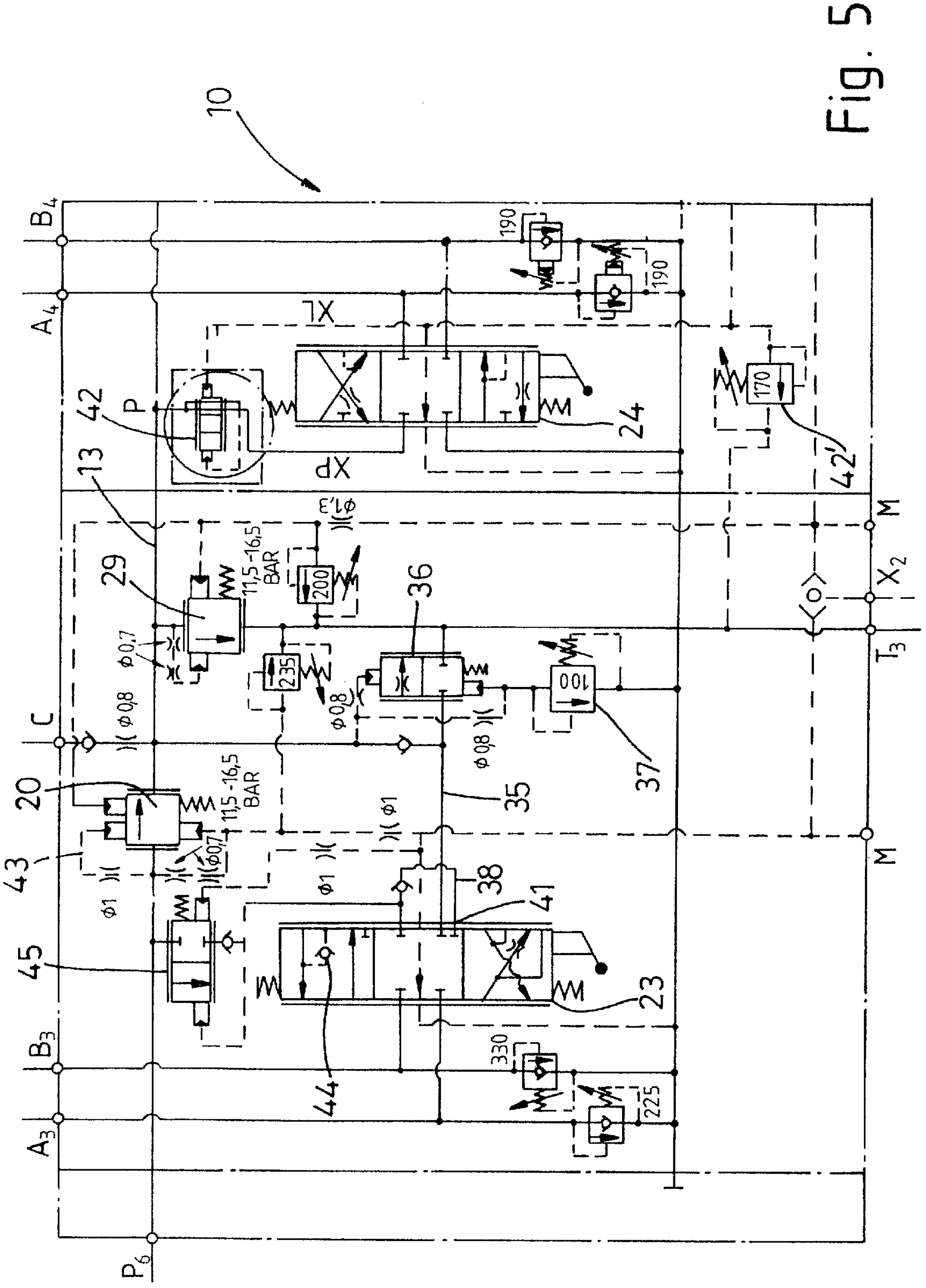
FIG. 5 shows on a larger scale a variant of FIG. 3, and depicts in detail a series/parallel control device.
Figure 6:
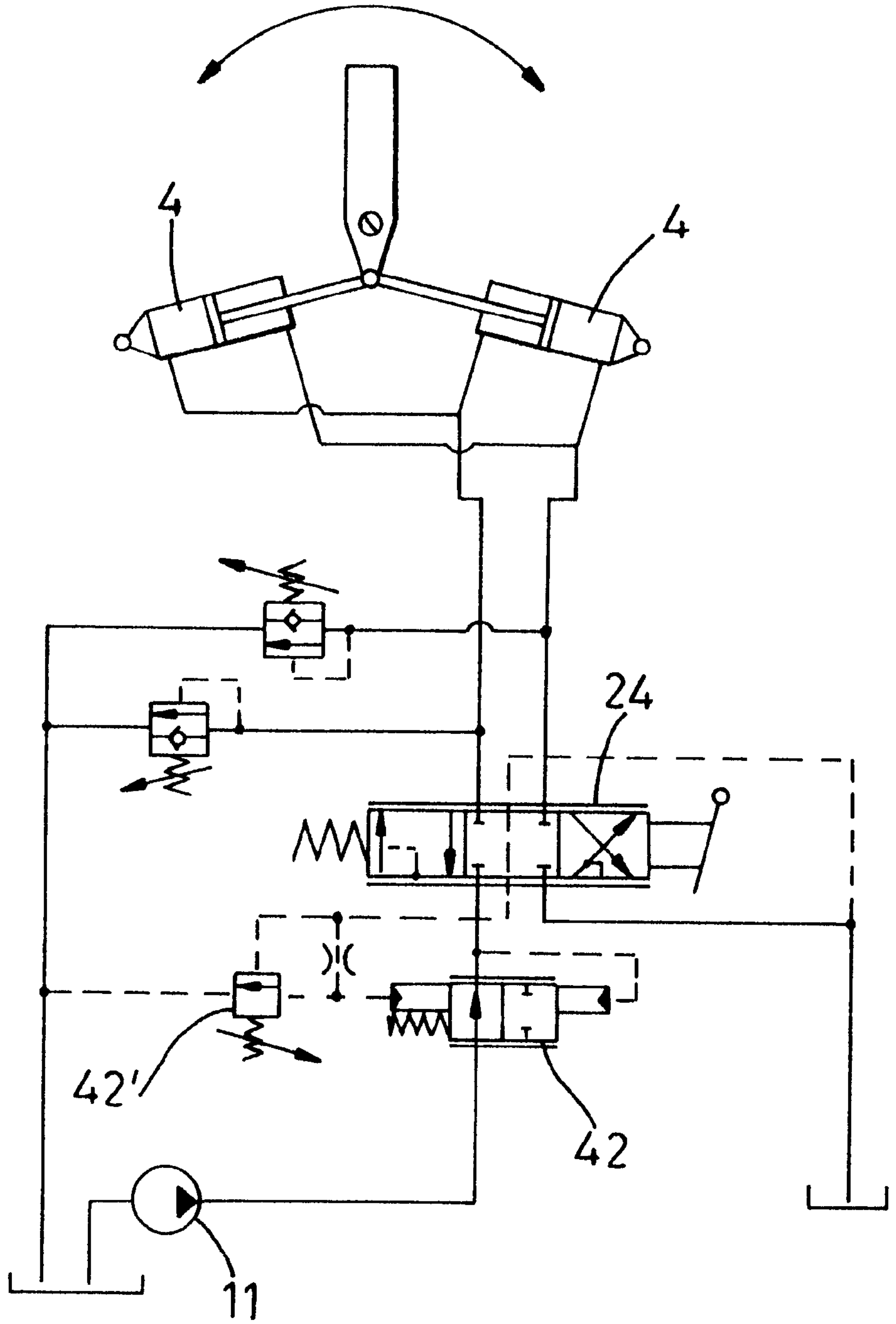
FIG. 6 is a diagrammatic view of a detail of FIG. 5.
Figure 7:
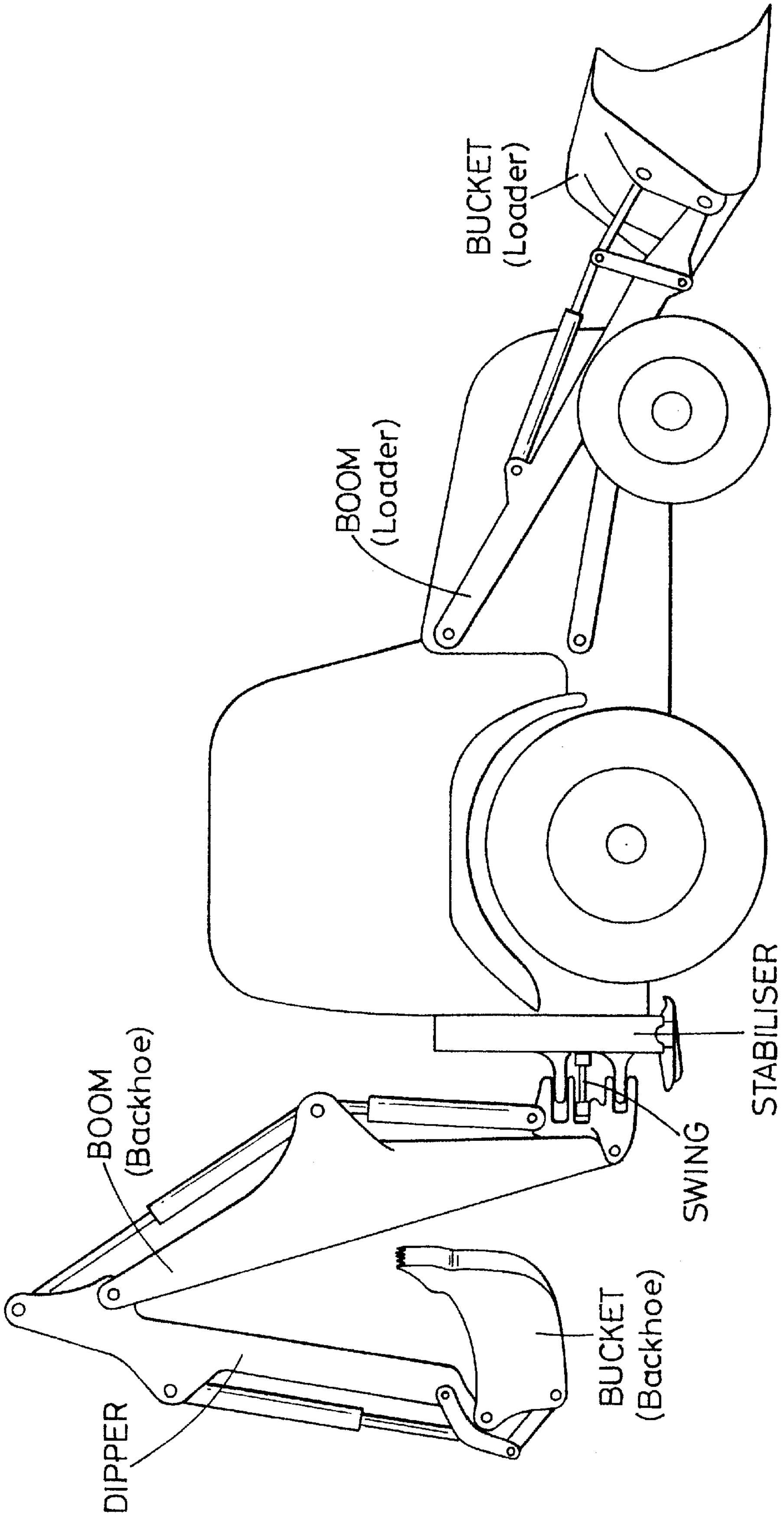
FIG. 7 is a schematic view of an-earth moving machine.

Still referring to FIG. 5, according to a further aspect of the invention, the main valve 23 of the second control section 10, i.e. the one controlling the movement of the first backhoe boom, is provided with a device for raising the load beyond the setting of the load sensing circuit 16. This device comprises a regeneration circuit 43 of the load sensing signal delivered to one side of the priority hydrostat 20, and a check valve 44 incorporated within the spool of the valve 23 and acting in the position of this spool corresponding to raising of the first boom of the backhoe.

Moreover, a local compensator 45 may also be associated with the main distributor 23 of the second control section 10.

It is pointed out that the control circuit according to the invention may be provided with different dispositions as alternatives to the use of the load sensing circuit 16. Thus, for example, a traditional open-center circuit disposition may be envisaged.

Naturally, within the principles of the invention, the details of construction and the embodiments may be widely varied with respect to what has been disclosed and illustrated, without thereby departing from the scope of the present invention as defined in the appended claims.

The invention claimed is:

1. A hydraulic control circuit for working members of a machine comprising a first assembly including first hydraulic linear actuators (1, 2) for operating respective first working members, and a second assembly including second hydraulic linear actuators (3–8) for operating respective second working members, the hydraulic circuit comprising first and second control sections (9, 10) for the first (1, 2) and second (3–8) hydraulic linear actuators, respectively, and including respective first (21, 22) and second (23–28) hydraulic spool valves, the spool of each of which can be set in a first end position corresponding to the displacement of the associated actuator in a first direction, in a central, null position, and in a second end position corresponding to the displacement of the associated actuator in a second direction opposite to said first direction, hydraulic pressure fluid supply means (11) connected in parallel to said first and second control sections (9, 10) via at least one feed line (13, 30), and a load sensing control circuit (16) associated with the first and second hydraulic spool valve (21–28) of the first and second control sections (9, 10) and operable to control the supply of hydraulic fluid to the first and second actuators in response to hydraulic signals indicative of the respective operating pressures thereof, wherein the second control section (10) includes a main hydraulic spool valve (23) and an associated priority hydrostat (20) disposed in the parallel feed line (13) and operable to control a main hydraulic actuator (3) of the second actuators, characterized in that the load sensing control circuit comprises a return line (35) from said main hydraulic spool valve (23) to the feed line (13) downstream of the priority hydrostat (20), and a series/parallel load sensing control valve (36) operable to control the communication between the return line (35) and the feed line (13) as a function of the pressure within the feed line (13), the spool of the hydraulic valve (23) incorporating a check valve (44) acting in the position corresponding to the height pressure movement of the associated main hydraulic actuator (3) controlling a working member, and a regeneration circuit (43) of the load sensing signal being associated with the priority hydrostat (20).

2. A hydraulic control circuit according to claim 1, wherein the second control section (10) includes a hydraulic spool valve (24) for simultaneously operating a pair of counter-acting hydraulic linear actuators (4) coupled to each other, and there is provided a local load sensing compensator (42) operatively associated with the valve (24).

3. A hydraulic control circuit according to claim 2, claims, wherein the first control section (9) further comprises a relief valve (34) in the feed line (30), the opening of which is piloted by the load sensing control circuit (16).

4. A hydraulic control circuit according to claim 2, and further comprising a regeneration device (31) disposed in the parallel feed line (13;30) from the supply means (11) to the first and second control sections (9,10).

5. A hydraulic control circuit according to claim 1, wherein the control circuit (16) is entirely of do load-sensing type, or entirely of the open center load-sensing type.

6. A hydraulic control circuit for working members of a machine comprising a plurality of hydraulic linear actuators (1,2,3–8) for operating respective working members, the hydraulic circuit comprising control means (9,10) for the hydraulic linear actuators and including hydraulic spool valve means (21,22,23–28) of which can be set in a first end position corresponding to the displacement of an associated actuator in a first direction, in a central, null position, and in a second end position corresponding to the displacement of the associated actuator in a second direction opposite to said first direction, hydraulic pressure fluid supply means (11) connected to the control means (9,10) via at least one feed line (13,30), and a load sensing control circuit (16) associated with the hydraulic spool valve means of the control means and operable to control the supply of hydraulic fluid to the actuators in response to hydraulic signals indicative of the respective operating pressures thereof, wherein the control means includes a main hydraulic spool valve (23) and an associated priority hydrostat (20) disposed in the parallel feed line (13) and operable to control a main hydraulic actuator (3), characterized in that the spool of said the main hydraulic valve (23) incorporates a check valve (44) acting in the position corresponding to the high pressure movement of the associated main hydraulic actuator (3) controlling movement of a working member, and in that a regeneration circuit (43) of the load sensing signal is associated with the priority hydrostat (20).

7. A hydraulic control circuit according to claim 8, wherein the load sensing control circuit comprises a return fine (35) from said main hydraulic spool valve (23) to the feed line (13) downstream of the priority hydrostat (20), and a series/parallel load sensing control valve (36) operable to control the communication between the return line (35).

8. A hydraulic control circuit according to claim 6, wherein the control circuit (16) is entirely of the load-sensing type, or entirely of the open center load-sensing type.

* * * * *